(12) United States Patent
Inoue et al.

(10) Patent No.: US 10,953,543 B2
(45) Date of Patent: Mar. 23, 2021

(54) OPERATION PROGRAM SETTING APPARATUS FOR ROBOT, ROBOT, AND METHOD OF CONTROLLING ROBOT

(71) Applicant: FANUC CORPORATION, Yamanashi (JP)

(72) Inventors: Toshihiko Inoue, Yamanashi (JP); Naoki Fujioka, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 215 days.

(21) Appl. No.: 16/296,571

(22) Filed: Mar. 8, 2019

(65) Prior Publication Data
US 2019/0291273 A1    Sep. 26, 2019

(30) Foreign Application Priority Data

Mar. 22, 2018 (JP) .............................. JP2018-053739

(51) Int. Cl.
*G06F 17/00* (2019.01)
*B25J 9/16* (2006.01)
(Continued)

(52) U.S. Cl.
CPC ............. *B25J 9/1664* (2013.01); *B23K 26/38* (2013.01); *B25J 11/005* (2013.01)

(58) Field of Classification Search
CPC ........ B25J 9/1664; B25J 11/005; B25J 9/161; B23K 26/38; B23K 26/70; G05B 2219/50353; G05B 2219/50355
(Continued)

(56) References Cited

U.S. PATENT DOCUMENTS

| 5,059,759 A | 10/1991 | Kudo et al. |
| 5,276,777 A * | 1/1994 | Hara ................... G05B 19/42 700/252 |

(Continued)

FOREIGN PATENT DOCUMENTS

| EP | 1 342 526 A2 | 9/2003 |
| GB | 2 229 125 A | 9/1990 |

(Continued)

OTHER PUBLICATIONS

Japanese Office Action dated Mar. 10, 2020, in connection with corresponding JP Application No. 2018-053739 (7 pgs., including machine-generated English translation).

(Continued)

*Primary Examiner* — Ronnie M Mancho
(74) *Attorney, Agent, or Firm* — Maier & Maier, PLLC

(57) ABSTRACT

A robot employing an operation program setting apparatus is configured to move, based on an operation program, a tool attached to a distal end portion of an arm of the robot along a predetermined processing trajectory along a work object, the operation program makes posture of the tool change at at least a position along the predetermined processing trajectory, the position is a posture changing position. The setting apparatus includes a controller configured to add a command to the operation program, the command is for making the tool start to be inclined when the tool approaches the posture changing position within a range of an acceptable inclination angle, the range is an angle range within which the tool is allowed to be inclined with respect to a surface of the work object.

6 Claims, 6 Drawing Sheets

(51) Int. Cl.
*B23K 26/38* (2014.01)
*B25J 11/00* (2006.01)

(58) Field of Classification Search
USPC .......................................................... 700/245
See application file for complete search history.

(56) References Cited

U.S. PATENT DOCUMENTS

| | | | | |
|---|---|---|---|---|
| 5,465,037 | A * | 11/1995 | Huissoon | B25J 9/1684 318/568.11 |
| 5,845,053 | A | 12/1998 | Watanabe et al. | |
| 7,209,801 | B2 * | 4/2007 | Anfindsen | B25J 9/1664 318/568.2 |
| 7,734,358 | B2 * | 6/2010 | Watanabe | G05B 19/425 700/61 |
| 10,056,010 | B2 * | 8/2018 | Salsich | B23K 9/0953 |
| 10,175,683 | B2 * | 1/2019 | Yamanaka | B25J 9/163 |
| 10,427,239 | B2 * | 10/2019 | Becker | B23K 9/0953 |
| 10,473,447 | B2 * | 11/2019 | Mathkar | B23K 9/1276 |
| 10,496,080 | B2 * | 12/2019 | Daniel | B23K 9/0953 |
| 10,710,240 | B2 * | 7/2020 | Atohira | G05B 19/4097 |
| 2011/0147347 | A1 | 6/2011 | Maurer | |
| 2012/0074110 | A1 * | 3/2012 | Zediker | B23K 26/1224 219/121.72 |

FOREIGN PATENT DOCUMENTS

| | | |
|---|---|---|
| JP | H01-273682 A | 11/1989 |
| JP | H02-290685 A | 11/1990 |
| JP | H05-35327 A | 2/1993 |
| JP | H05-57643 A | 3/1993 |
| JP | H05-257522 A | 10/1993 |
| JP | H07-032279 A | 2/1995 |
| JP | H08-123536 A | 5/1996 |
| JP | H11-048176 A | 2/1999 |
| JP | 2003-245773 A | 9/2003 |
| JP | 2004-174586 A | 6/2004 |

OTHER PUBLICATIONS

Japanese Search Report dated Feb. 28, 2020, in connection with corresponding JP Application No. 2018-053739 (73 pgs., including machine-generated English translation).

* cited by examiner

FIG. 3

| CONDITION | WORK OBJECT | | OUTPUT LEVEL OF LASER BEAM | ASSIST GAS | | RANGE OF ACCEPTABLE INCLINATION ANGLE (deg) |
| --- | --- | --- | --- | --- | --- | --- |
| | MATERIAL | PLATE THICKNESS (mm) | | TYPE | OUTPUT LEVEL | |
| 1 | IRON 1 | 2 | 3 | N2 | 4 | 20 |
| 2 | IRON 1 | 2 | 4 | N2 | 4 | 25 |
| 3 | IRON 1 | 3 | 3 | N2 | 4 | 15 |
| 4 | IRON 1 | 3 | 4 | N2 | 4 | 20 |
| 5 | IRON 2 | 2 | 3 | N2 | 4 | 18 |
| ... | | | | | | |

OPERATION PROGRAM SETTING APPARATUS FOR ROBOT, ROBOT, AND METHOD OF CONTROLLING ROBOT

CROSS-REFERENCE TO RELATED APPLICATIONS

This application is based on and claims priority to Japanese Patent Application No. 2018-053739 filed on Mar. 22, 2018, the content of which is incorporated herein by reference in its entirety.

FIELD

The present invention relates to an operation program setting apparatus for a robot, the robot, and a method of controlling the robot.

BACKGROUND

Japanese Unexamined Patent Application, Publication No. H11-48176 discloses a robot that is operated based on an operation program. A controller for the robot compares operation angles of joints of the robot that is actually operated based on the operation program with operation angles of the joints set by the operation program, and calculates an error in an actual operation based on the comparison.

SUMMARY

A first aspect of the present disclosure provides an operation program setting apparatus for a robot, wherein the robot is configured to move, based on an operation program, a tool attached to a distal end portion of an arm of the robot along a predetermined processing trajectory along a work object, the operation program is for making posture of the tool change at at least a position along the predetermined processing trajectory, the position is a posture changing position, and the operation program setting apparatus includes: a controller configured to add a command to the operation program, the command is for making the tool start to incline when the tool approaches the posture changing position within a range of an acceptable inclination angle, and the range is an angle range within of an angle at which the tool is allowed to be inclined with respect to a surface of the work object.

A robot according to second aspect of the present disclosure includes: an arm having a distal end portion to which a tool is attached; and a controller configured to control the arm based on an operation program, and move the tool along a predetermined processing trajectory along a work object, wherein the operation program is for making posture of the tool to be changed at at least a position along the predetermined processing trajectory, the position is a posture changing position, and the controller is configured to make the tool start to be inclined when the tool approaches the posture changing position within a range of an acceptable inclination angle, the range is an angle range within which the tool is allowed to be inclined with respect to a surface of the work object.

A third aspect of the present disclosure provides a method of controlling a robot provided with an arm having a distal end portion to which a tool is attached, the method including: a processing which controls the arm of the robot to move the tool along a predetermined processing trajectory along a work object, wherein the processing trajectory includes at least one posture changing position at which posture of the tool is required to be changed, and in the processing, the controller makes the tool start to be inclined when the tool approaches the posture changing position within a range of an acceptable inclination angle, the range is an angle range at which the tool is allowed to be inclined with respect to a surface of the work object.

BRIEF DESCRIPTION OF DRAWINGS

FIG. 3 is a diagram showing acceptable angle setting data in this embodiment.

DETAILED DESCRIPTION

Hereinafter, a controller 30 as an operation program setting apparatus according to an embodiment of the present invention will be described with reference to the drawings.

Figure 1:
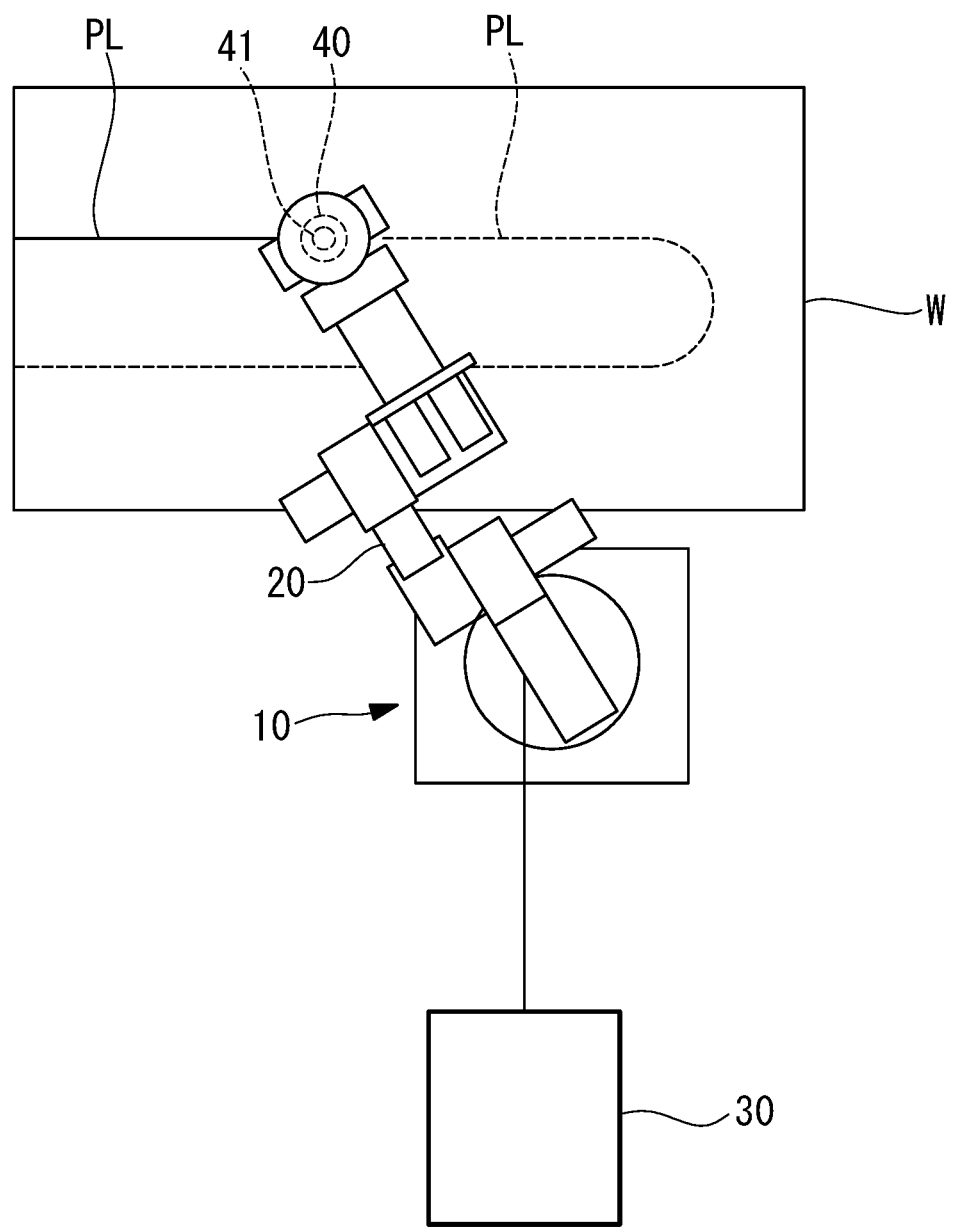
FIG. 1 is a schematic plan view of a robot according to an embodiment of the present invention.

In this embodiment, the controller 30 is a robot controller provided for a robot 10. As illustrated in FIG. 1, the robot 10 includes an arm 20, and a tool 40 is attached to at a distal end of the arm 20.

Figure 2:
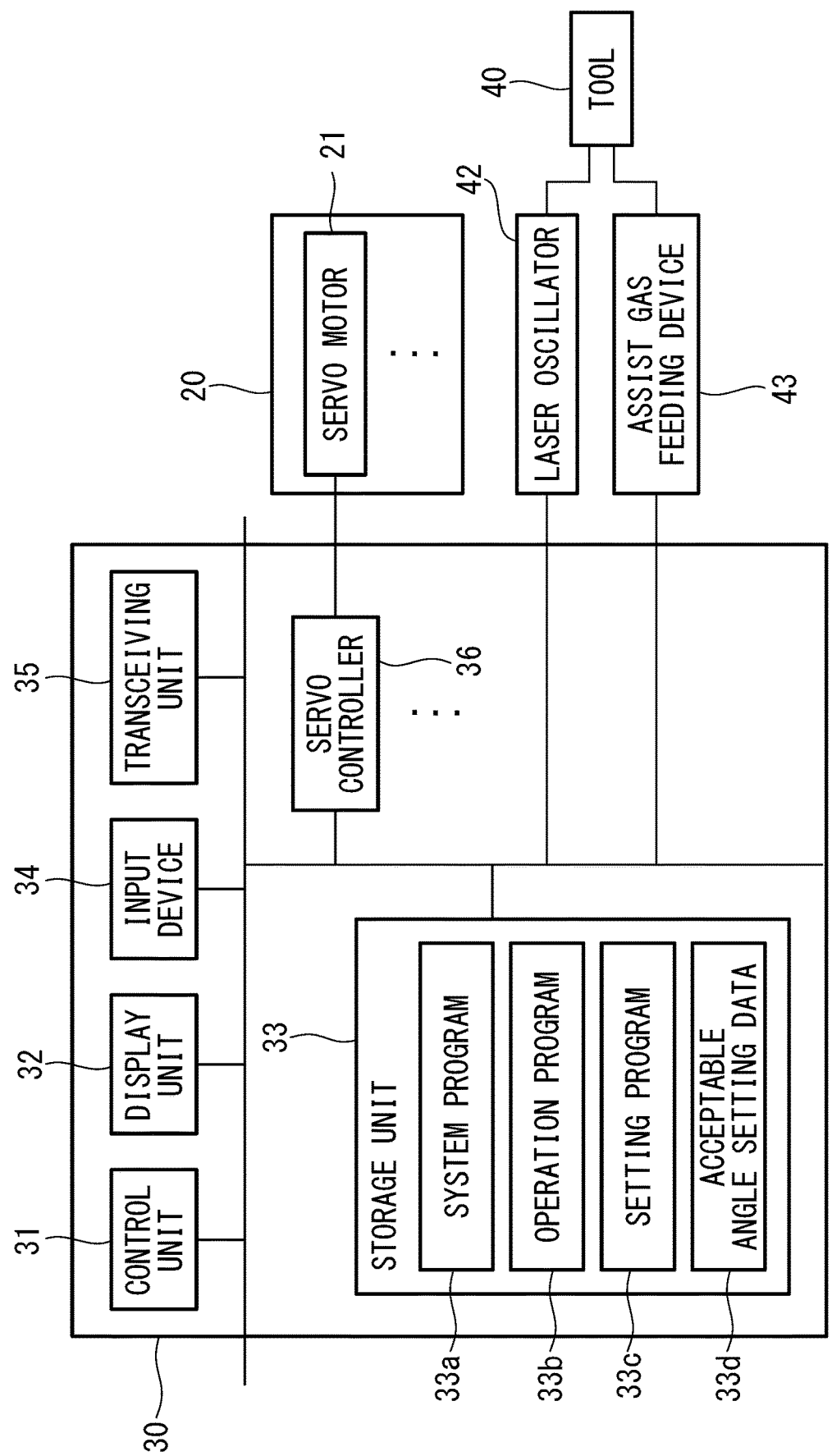
FIG. 2 is a block diagram of a controller of the robot according to this embodiment.
Figure 5:
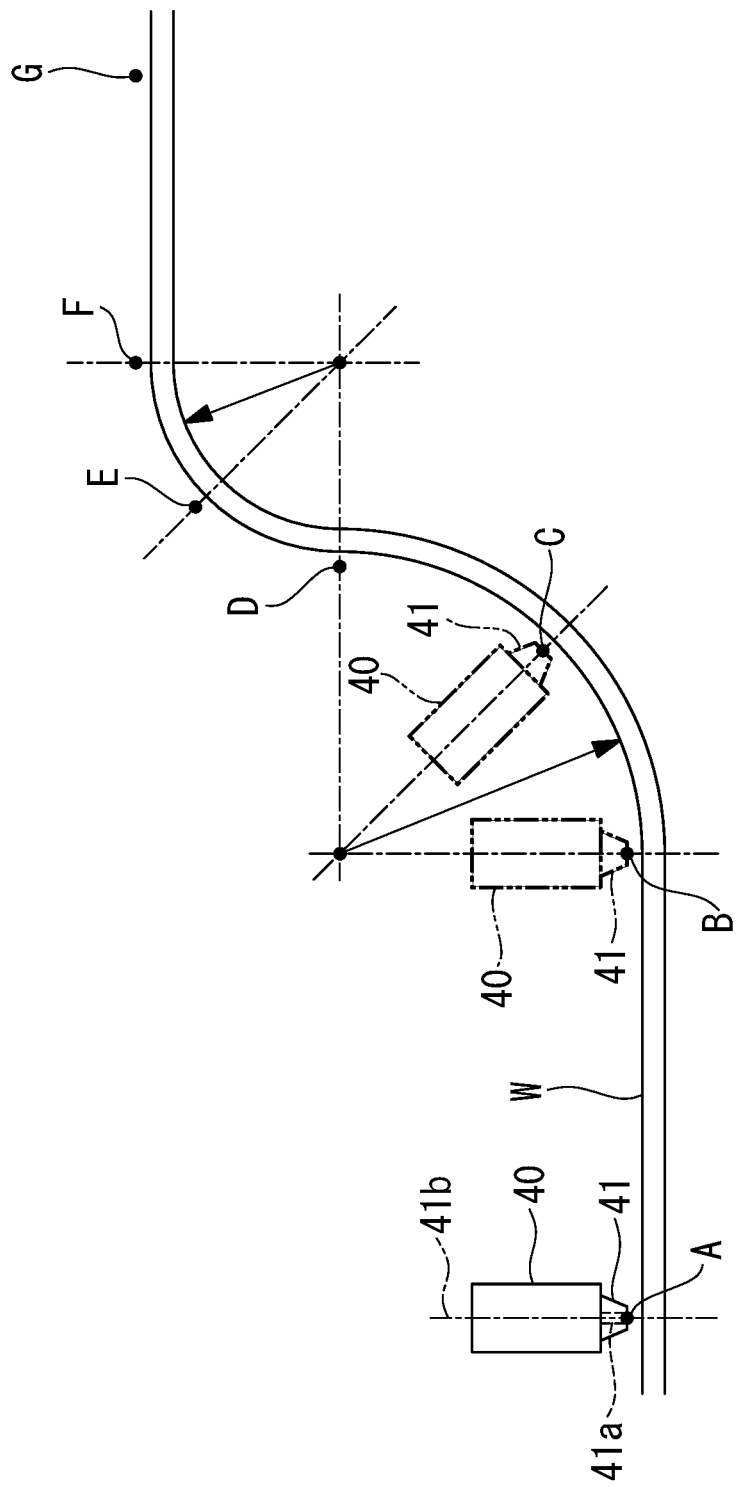
FIG. 5 is a diagram illustrating an operation of a tool according to this embodiment.
Figure 6:
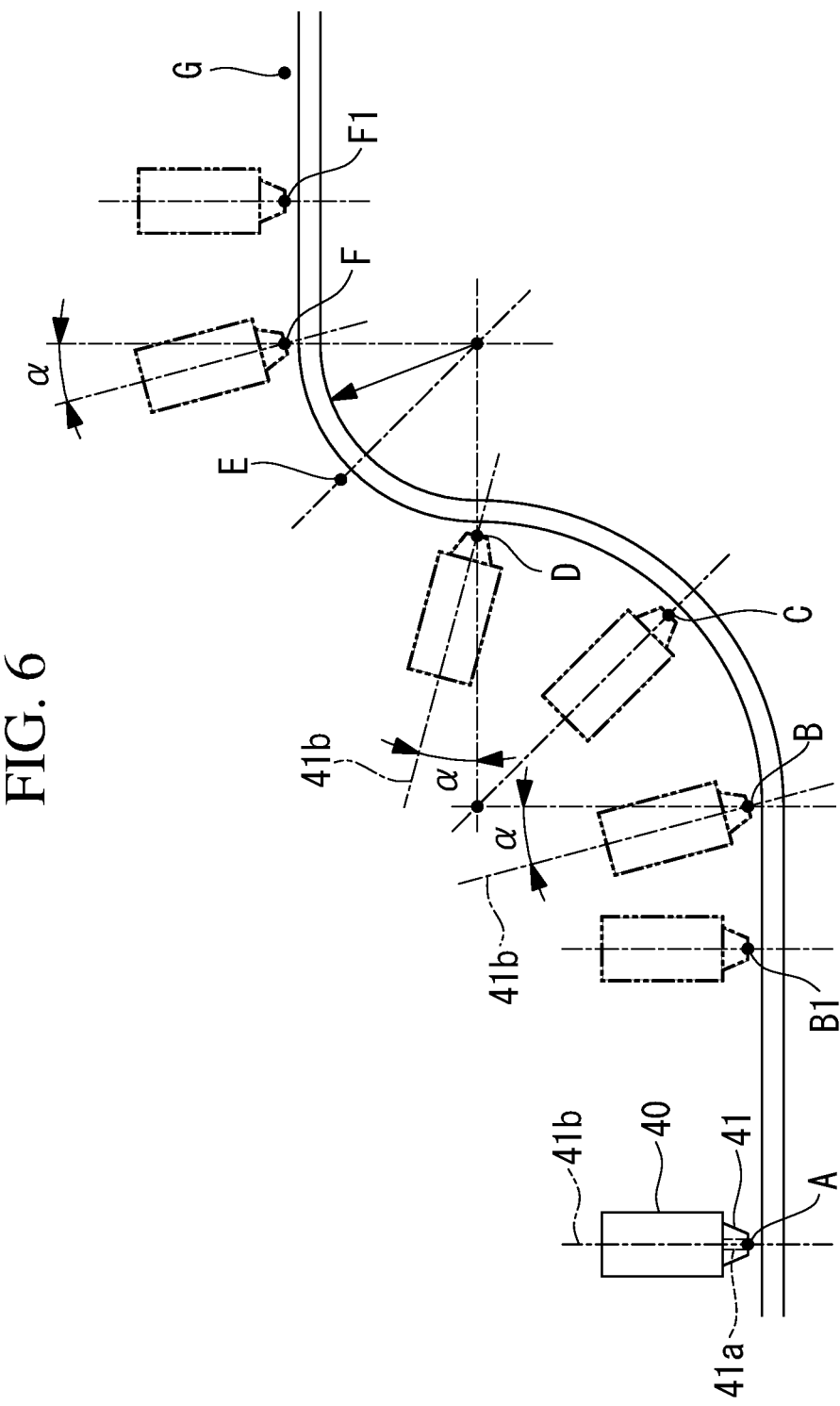
FIG. 6 is a diagram illustrating an operation of the tool according to this embodiment.

In this embodiment, the tool 40 is a laser cutting tool for carrying out laser cutting. As illustrated in FIG. 5 and FIG. 6, a nozzle 41 is provided at a distal end of the tool 40, and a through hole 41a having a diameter of around 1 mm is formed in the nozzle 41. The through hole 41a extends in a direction along a longitudinal axis line of the tool 40. The tool 40 is connected to a laser oscillator 42 (FIG. 2), and irradiation of a laser beam generated by the laser oscillator 42 is cast onto a work object W through the through hole 41a in the nozzle 41. Further, the tool 40 is connected to an assist gas feeding device 43 (FIG. 2). The assist gas feeding device 43 supplies assist gas to the tool 40, and the assist gas is sprayed onto the work object W through the through hole 41a or a hole for assist gas in the nozzle 41. By irradiating the laser beam and spraying the assist gas onto the work object W, the work object W is cut.

The arm 20 includes a plurality of arm members and a plurality of joints. The arm 20 also includes a plurality of servo motors 21 that respectively drive the plurality of joints (see FIG. 2). Examples of the servo motors 21 that may be used include servo motors of various types such as rotary motors and linear motors. Each of the servo motors 21 includes an operational position detecting device for detecting its operational position and operational speed. One example of the operational position detecting device is an encoder. Detected values of the operational position detecting devices are transmitted to the controller 30.

As illustrated in FIG. 2, the controller 30 includes a control unit 31 having a processor or the like, a display unit 32, a storage unit 33 having a non-volatile storage, a ROM, a RAM, or the like, an input device 34 such as a teach pendant, a transceiving unit 35 for transmitting and receiving signals, and servo controllers 36 respectively connected to the servo motors 21. The input device 34 and the transceiving unit 35 serve as an input unit.

As illustrated in FIG. 2, the robot controller 30 is connected to the laser oscillator 42 and the assist gas feeding device 43. The robot controller 30 controls the laser oscillator 42 and the assist gas feeding device 43 based on the operation program that will be later described, and thus performs cutting of the work object W.

In this embodiment, the controller 30 is a robot controller that controls the operation of the robot 10. However, the controller 30 may be a controller disposed within the robot controller or for the robot 10, and provided with a configuration described above. Further, the controller 30 may be a teaching device disposed at a different position from the robot 10 in order to create the operation program for the robot 10, or may be a simulation device having a model of the robot 10. It should be noted that if the controller 30 is a teaching device or a simulation device, in Step S1-2 described later, the tool 40 is moved to a plurality of positions by operating the robot 10 set within the teaching device or the simulation device.

The storage unit 33 stores a system program 33a, and the system program 33a is responsible for a basic function of the controller 30. Further, the storage unit 33 stores an operation program 33b. The control unit 31 is operated based on the system program 33a. Further, the control unit 31 reads the operation program 33b, and controls the servo controller 36, the laser oscillator 42, and the assist gas feeding device 43 based on the operation program 33b. With this, the robot 10 moves the tool 40, for example, along a processing trajectory PL as illustrated in FIG. 1, and thus the work object W is cut along the processing trajectory PL.

The storage unit 33 stores a setting program 33c and an acceptable angle setting data 33d.

As illustrated in FIG. 3, for example, the acceptable angle setting data 33d is data that makes correspondence between parameters such as a material of the work object W, a plate thickness of the work object W, an output level of a laser beam from the tool 40, an output level of assist gas from the tool 40, and a type of the assist gas, and a range of an acceptable inclination angle of the tool 40. The range of the acceptable inclination angle is a range of an angle at which the tool 40 may be inclined with respect to a surface of the work object W.

It should be noted that when carrying out laser cutting using the tool 40, preferably, a state in which a central axis line 41b of the through hole 41a in the nozzle 41 is parallel with a vertical line or a normal line of the surface of the work object W is maintained. The surface is at or near a position on the work object W at which processing by the nozzle 41 is performed. In this embodiment, an inclination angle of the central axis line 41b with respect to the vertical line or the normal line of the surface of the work object W corresponds to an inclination angle $\alpha$ of the tool 40 with respect to the surface of the work object W (FIG. 6).

Here, in order to ensure quality at a cut portion, a gap between the nozzle 41 of the tool 40 that carries out the laser cutting and the surface of the work object W is small, and the gap is around 1 mm, for example. On the other hand, a diameter of a distal end of the nozzle 41 is around 5 mm, for example. Therefore, the inclination angle $\alpha$ of the tool 40 with respect to the surface of the work object W is physically restricted.

On the other hand, the inclination angle $\alpha$ of the tool 40 with respect to the surface of the work object W is restricted in view of the cutting quality, depending on the parameters such as an output level of a laser beam from the tool 40, a material of the work object W, a plate thickness of the work object W, an output level of assist gas from the tool 40, and a type of the assist gas. Further, the inclination angle $\alpha$ of the tool 40 with respect to the surface of the work object W may be restricted in view of the cutting quality, based on requirements of a structure of the distal end of the nozzle 41 for spraying the assist gas, and an angle at which the assist gas is sprayed.

Depending on the physical restrictions and the restrictions based on the cutting quality, the range of the acceptable inclination angle of the tool 40 is set. The range of the acceptable inclination angle is an acceptable range of the inclination angle $\alpha$ of the central axis line 41 with respect to the vertical line or the normal line of the surface of the work object W.

Figure 4:
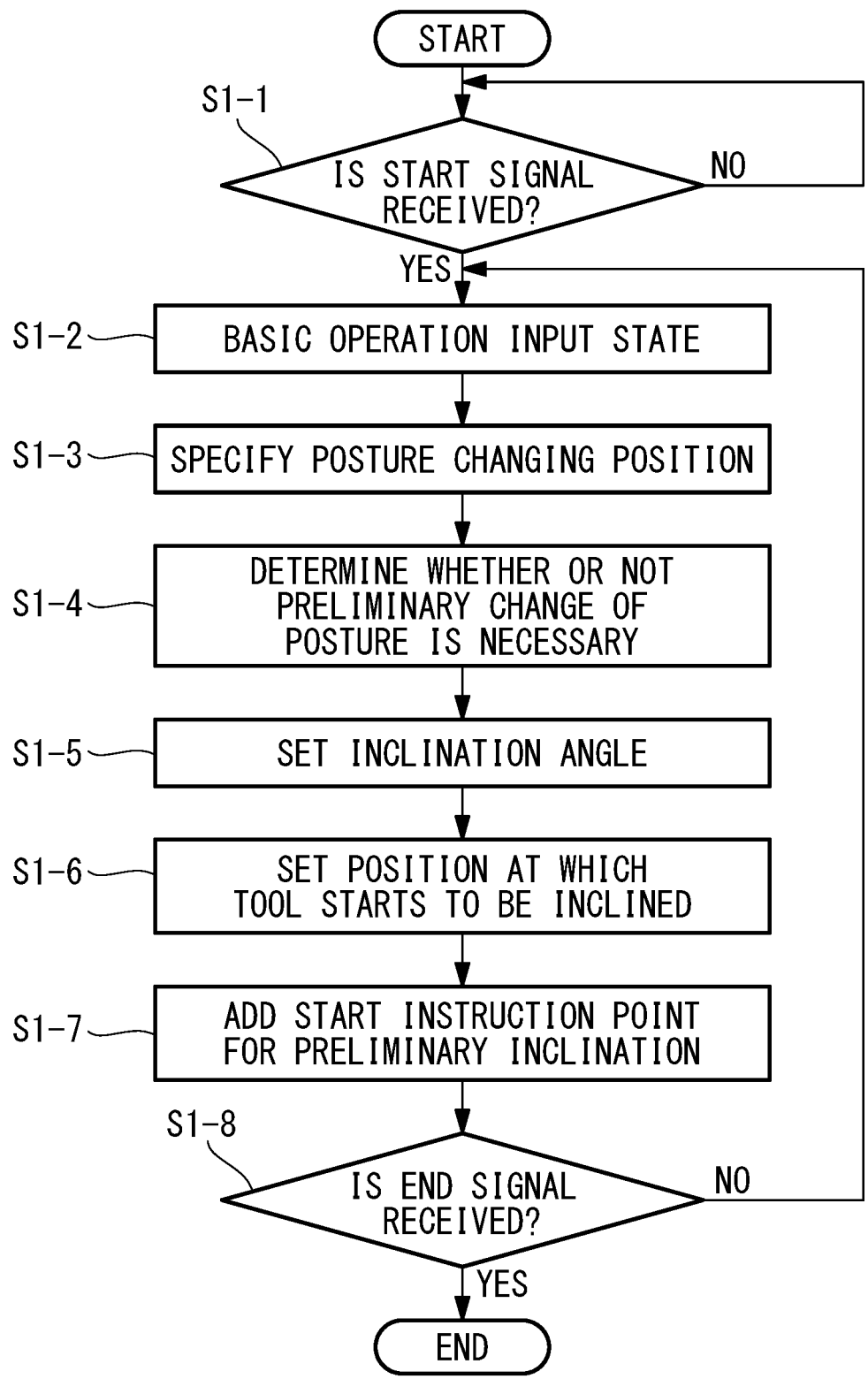
FIG. 4 is a flowchart showing processing by the controller according to this embodiment.

When a user of the robot 10 sets the operation program 33b for carrying out cutting of the work object W, the control unit 31 performs a following process based on the setting program 33c. The following process is shown in a flowchart in FIG. 4.

First, when the control unit 31 receives a start signal input using the input device 34 and the transceiving unit 35 (Step S1-1), the process becomes a basic operation input state for inputting a basic operation (Step S1-2). The basic operation shows how a distal end portion of the robot 10 and a position and posture of the tool 40 are to be changed.

In this embodiment, in Step S1-2, the user manually moves the tool 40 supported by the distal end portion of the robot 10 to a plurality of positions. At each of the positions, since the tool 40 takes various posture, each position represents both the position and the posture. Hereinafter, the plurality of positions are referred to as a plurality of instruction points. By the user making predetermined inputs to the input device 34, control parameters, control commands, and the like of the robot 10 respectively correspond to the plurality of instruction points are stored in the storage unit 33. Further, based on the predetermined inputs, interpolation control parameters, interpolation control commands, and the like of the robot between the plurality of instruction points are stored in the storage unit 33.

The control parameters and the interpolation control parameters are parameters for controlling the servo controllers 36, the laser oscillator 42, the assist gas feeding device 43, and the like, and the control commands and the interpolation control commands are a group of control commands for controlling the servo controllers 36, the laser oscillator 42, the assist gas feeding device 43, and the like.

Here, the interpolation control parameters and the interpolation control commands may not be stored in the storage unit 33 in Step S1-2. In this case, when the robot 10 actually carries out the operation, the control unit 31 calculates the interpolation control parameters and the interpolation control commands.

In the example illustrated in FIG. 5, the user manually moves the tool 40 supported by the distal end portion of the robot 10 to an instruction point A and an instruction point B. By carrying out the predetermined inputs to the input device 34, the control unit 31 stores the control parameters, the control commands, and the like of the robot 10 that correspond to each of the instruction point A and the instruction point B in the storage unit 33.

Further, the user uses the input device 34 to input a movement mode for linearly moving the tool 40 from the instruction point A to the instruction point B.

At this time point, the operation program 33b from the instruction point A to the instruction point B is created, and when the operation program 33b is executed, the robot 10 moves the tool 40 from the instruction point A to the instruction point B. As described above, in this embodiment, there is a case in which the operation program 33b corresponds only to a part of the processing trajectory PL.

Upon creation of the operation program 33b from the instruction point A to the instruction point B, the storage unit 33 also stores the interpolation control parameters, the interpolation control commands, and the like of the robot 10 for linearly moving the tool 40 from the instruction point A to the instruction point B. Subsequently, when the user teaches an instruction point C and an instruction point D in FIG. 5, and inputs a movement mode for moving the tool 40 from the instruction point B to the instruction point D along a concave curve having a predetermined curvature radius, the storage unit 33 stores the interpolation control parameters, the interpolation control commands, and the like of the robot 10 for moving the tool 40 from the instruction point B to the instruction point D along the concave curve. At this time point, the operation program 33b from the instruction point A to the instruction point D is created.

In a different example, in Step S1-2, the control unit 31 creates, based on CAD data, a set of parameters, a set of control commands, and the like for moving the nozzle 41 along the processing trajectory PL illustrated in FIG. 1. The set of parameters include at least information on a plurality of instruction points, information on the movement mode of the tool between the instruction points, and the like. Examples of the CAD data include three-dimensional CAD data of the work object W, three-dimensional CAD data of the nozzle 41, and three-dimensional CAD data of the robot 10. The set of the control commands are, for example, for making the inclination angle α of the tool 40 with respect to the surface of the work object W be at 0° at each of the positions along the processing trajectory PL.

After Step S1-2, the control unit 31 specifies a posture changing position at which the posture of the tool 40 is changed (Step S1-3). For example, in FIG. 5, when the central axis line 41b of the tool 40 is maintained vertically with respect to the surface of the work object W between the instruction point B and the instruction point D, the posture of the tool 40 changes between the instruction point B and the instruction point D. In other words, on the processing trajectory PL, positions between the instruction point B and the instruction point D are posture changing area. Similarly, positions between the instruction point D and an instruction point F are also posture changing positions. In this embodiment, the work object W includes inflecting portions inflected in its plate thickness direction, and the posture changing positions are provided by such portions.

Next, the control unit 31 determines, for each of the posture changing positions, whether or not it is necessary to change the posture of the tool 40 preliminary (Step S1-4). The determination in Step S1-4 is made, for example, using an amount of change of the posture of the tool 40, required processing speed, rigidity of the arm 20 of the robot 10, and the like at each of the posture changing positions. Here, the processing speed is, for example, a speed of the nozzle 41 of the tool 40 that is moved by the robot 10. For example, when it is required to reduce the processing time of the work object W, the required processing speed is high.

If the required processing speed is low, the posture of the tool 40 may not have to be changed preliminary. However, when the required processing speed is high, for example, in FIG. 5, if the posture of the tool 40 changes by 90° between the instruction point B and the instruction point D, the position of the nozzle 41 of the tool 40 may become unstable due to the change of the posture. This is because the robot 10 has a cantilever structure. If the posture of the tool 40 is changed at high speed, the tool 40 swings, for example, due to inertia of the arm 20 and the tool 40, flexure of the arm 20, and the like. Therefore, processing defects such as unintended curves and concavity and convexity may be produced in the processing surface.

Therefore, in Step S1-4, it is determined whether or not the posture of the tool 40 is required to be changed preliminary, for each of the posture changing positions, using the amount of change of the posture of the tool 40, the required processing speed, and the rigidity of the arm 20.

Next, for the posture changing position at which the preliminary change of the posture is required, the control unit 31 sets the inclination angle α of the tool 40 when or immediately before the tool 40 reaches the posture changing position (Step S1-5). Here, the user has previously input the material of the work object W, the plate thickness of the work object W, the output level of the laser beam, the type of the assist gas, and the like using the input device 34, and the control unit 31 recognizes such input information. The material of the work object W, the plate thickness of the work object W, the output level of the laser beam, the type of the assist gas, and the like may be input using the transceiving unit 35. Then, in Step S1-5, the control unit 31 refers to the acceptable angle setting data 33d, and sets the inclination angle α of the tool 40 within the range of the acceptable inclination angle that corresponds to the input information.

For example, in Step S1-5, when processing on a condition 1 in FIG. 3 is performed, the control unit 31 sets the inclination angle α at 15° when or immediately before the tool 40 reaches the instruction point B (FIG. 6). It should be noted that the instruction point B is an instruction point that the tool 40 first reaches among the posture changing positions between the instruction point B and the instruction point D. Here, if there is no exactly matching condition, the inclination angle α is set using a close condition, or the inclination angle α is set using a tendency obtained from a plurality of conditions.

Subsequently, the control unit 31 sets a position at which the tool 40 starts to be inclined in order to make the tool 40 at the inclination angle α when or immediately before the tool 40 reaches the posture changing position (Step S1-6). In performing the process in Step S1-6, the control unit 31 at least uses the speed of the tool 40 when the tool 40 approaches the posture changing position, and time necessary for the inclination. The time necessary for the inclination changes according to the inertia of the arm 20 and the tool 40, the rigidity of the arm 20, and the like.

Then, the control unit 31 adds a command relating to the inclination angle α set in Step S1-5 to the operation program 33b that is created, and adds a start inclination position set in the Step S1-6 to the operation program 33b that is created as a start instruction point B1 for the preliminary inclination (Step S1-7).

Here, in Step S1-5, as illustrated in FIG. 6, the inclination angle α when or immediately before the tool 40 reaches the instruction point D may also be set at 15°. In this case, similarly, an amount of change of the posture of the tool 40 between the instruction point D and the instruction point F is reduced.

Further, as illustrated in FIG. 6, the inclination angle α when or immediately after the tool 40 passes the instruction point F may be set at 15°. In other words, the control unit 31 adds the command to the operation program 33b, and the command is for making the tool 40 be inclined within the range of the acceptable inclination angle when or immediately after the tool 40 passes a section between the instruction point D and the instruction point F as the posture changing position. In this embodiment, such inclination is also referred to the preliminary inclination.

By setting the preliminary inclination when or immediately after the tool 40 passes the posture changing position in this manner, the amount of change of the posture of the tool 40 between the instruction point D and the instruction point F is reduced. In this case, in Step S1-6, it is possible to determine a position at which the inclination of the tool 40 ends, and in Step S1-7, the end inclination position that has been set in Step S1-6 may be added, as an end instruction point F1 for the preliminary inclination, to the operation program 33b that is created.

The control unit 31 repeats Steps S1-2 to S1-7 until an end signal is received that is input using the input device 34, the transceiving unit 35, and the like (Step S1-8).

It should be noted that Steps S1-3 to S1-7 may be performed after the operation program 33b that corresponds to the processing trajectory PL as a whole is created in Step S1-2.

Further, the control unit 31 may recognize all of the posture changing positions previously, or the control unit 31 may recognize all of the posture changing positions based on information input using the input device 34 and the like. In these cases, it is not necessary to perform Step S1-3.

Further, the posture of the tool 40 may be preliminary changed for all of the posture changing positions. For example, such a configuration is employed when it is known that the posture of the tool 40 changes largely for all of the posture changing positions. In this case, it is not necessary to perform Step S1-4.

Further, the inclination angle α of the tool 40 when or immediately before the tool 40 reaches the posture changing position may be previously set. For example, in a case in which it is possible to prevent a processing defect of the processing surface using the inclination angle α that is sufficiently small with respect to the acceptable inclination angle, the inclination angle α of the tool 40 when or immediately before the tool 40 reaches the posture changing positions may be set for all of the posture changing positions. In this case, it is not necessary to perform Step S1-5.

Further, it is also possible to previously set the position at which the tool 40 starts to be inclined. For example, the position at which the tool 40 starts to be inclined may be set based on the information input using the input device 34 and the like. In this case, it is not necessary to perform Step S1-6.

Further, in Step S1-6, timing at which the tool 40 starts to be inclined may be set instead of setting the position at which the tool 40 starts to be inclined. For example, one second before the tool 40 reaches the posture changing position is set as the timing at which the tool 40 starts to be inclined.

Further, the storage unit 33 may store an acceptable angle setting formula in place of the data that makes correspondence between the parameters such as the material of the work object W and the plate thickness of the work object W and the range of the acceptable inclination angle of the tool 40. In this case, the acceptable angle setting formula may derive the range of the acceptable inclination angle based on the parameters such as the material of the work object W, the plate thickness of the work object W, the output level of the laser beam from the tool 40, the output level of the assist gas from the tool 40, and the type of the assist gas.

In this embodiment, the control unit 31 is configured to add the command to the operation program 33b, and the command is for making the tool 40 be inclined at time when the tool 40 approaches the posture changing position within the range of the acceptable inclination angle as an angle range at which the tool 40 may be inclined with respect to the surface of the work object W.

The time when the tool 40 approaches posture changing position correspond to timing at which the tool 40 reaches the posture changing position. In other words, in this embodiment, a command for making the tool 40 start to be inclined before the tool 40 reaches the posture changing position is added to the operation program 33b. For example, even when the tool 40 is required to be inclined largely at the posture changing position according to a shape of the surface of the work object W, the tool 40 starts to be inclined preliminary before the tool 40 reaches the posture changing position. Therefore, it is possible to reduce the amount of the change of the posture of the tool 40 at the posture changing position, and this is advantageous for improving the operation speed of the robot 10 while ensuring the quality of the portion to be processed.

Further, in this embodiment, the tool 40 is a laser cutting tool, and there is provided the storage unit 33 that stores the acceptable angle setting data that makes correspondence between the parameters such as the material and the plate thickness of the work object W and the range of the acceptable inclination angle. The control unit 31 adds the command to the operation program 33b, the command relating to the inclination angle α of the tool 40 when or immediately before the tool 40 reaches the posture changing position within the range of the acceptable inclination angle obtained by using the acceptable angle setting data.

Further, the tool 40 is a laser cutting tool, and there is provided the storage unit 33 that stores the acceptable angle setting formula for deriving the range of the acceptable inclination angle based on the parameters such as the material and the plate thickness of the work object W. The control unit 31 adds the command to the operation program 33b, the command relating to the inclination angle α of the tool 40 when or immediately before the tool 40 reaches the posture changing position within the range of the acceptable inclination angle obtained by using the acceptable angle setting formula.

As described above, the control unit 31 sets the inclination angle α of the tool 40 automatically when or immediately before the tool 40 reaches the posture changing position, and therefore it is possible to reduce time and effort when the operation program 33b is set.

Further, in this embodiment, the position or the timing at which the tool 40 starts to be inclined toward the inclination angle α is automatically set by the control unit 31. Therefore, it is possible to reduce time and effort when the operation program 33b is set.

Further, in this embodiment, the start instruction point B1 at which the tool 40 starts to be inclined toward the inclination angle α is automatically added to the operation program 33b. Therefore, it is possible to reduce time and effort when the operation program 33b is set.

Further, setting of the operation program 33b for processing greatly affects the stability of the quality of the portion to be processed. In this embodiment, as the start instruction point B1 is clearly set, it is possible to improve stability of the quality of the portion to be processed, as compared to a case in which the start instruction point B1 is set every time by an interpolation program or the like of the robot 10.

In this embodiment, the control unit 31 sets and re-writes the operation program 33b. By contrast, the control unit 31 may control the arm 20 of the robot 10 based on the operation program 33b, and when the tool 40 approaches the posture changing position between the instruction point B and the instruction point D shown in FIG. 5, for example, the control unit 31 may make the tool 40 start to be inclined preliminary.

In this case, the operation program 33b is not instructed to make the tool 40 start to be inclined preliminary, for example, as illustrated in FIG. 5.

On the other hand, the user previously inputs the material of the work object W, the plate thickness of the work object W, the output level of the laser beam, an output level of the assist gas, the type of the assist gas, and the like using the input device 34. Therefore, the control unit 31 recognizes such input information.

The control unit 31 refers to the acceptable angle setting data 33d stored in the storage unit 33, and determines the inclination angle α of the tool 40 when or immediately before the tool 40 reaches the posture changing position within the range of the acceptable inclination angle that corresponds to the input information. Then, the control unit 31 changes the posture of the tool 40 to the posture corresponding to the determined inclination angle α, when the tool 40 approaches the posture changing position.

Similarly, in this case, the tool 40 starts to be inclined before the tool 40 reaches the posture changing position. For example, even when the tool 40 is required to be inclined largely at the posture changing position according to a shape of the surface of the work object W, the tool 40 starts to be inclined preliminary before the tool 40 reaches the posture changing position. Therefore, it is possible to reduce the amount of the change of the posture of the tool 40 at the posture changing position, and this is advantageous for improving the operation speed of the robot 10 while ensuring the quality of the portion to be processed.

It should be noted that in the embodiment, it is sufficient that the acceptable angle setting data 33d and the acceptable angle setting formula are such that the range of the acceptable inclination angle may be derived at least the material and the plate thickness of the work object W. For example, the output level of the laser beam from the tool 40, the output level of the assist gas from the tool 40, the type of the assist gas, and the like are not necessary for a laser cutting equipment for which these parameters are hardly changed.

It should be noted that in the embodiment, the tool 40 may be a tool for cutting a plastic plate with waterjet along a predetermined processing trajectory. Further, the tool 40 may be a tool for applying a sealing material along a predetermined processing trajectory. Further, the tool 40 may be a tool for applying a paint along a predetermined processing trajectory. Further, the tool 40 may be a tool for welding along a predetermined processing trajectory.

It should be noted that in the embodiments described above, a direction in which the tool 40 is inclined preliminary is a direction in which the amount of the change (inclination) of the posture of the tool 40 at the posture changing position is reduced.

On the other hand, the direction in which the tool 40 is inclined preliminary is not limited to the direction along the processing trajectory. For example, when the tool 40 is inclined in a direction intersecting with the processing trajectory at the posture changing position, the direction in which the tool 40 is inclined preliminary also corresponds to the direction intersecting with the processing trajectory.

From the above-described embodiments, the following aspects of the present disclosure are derived.

A first aspect of the present disclosure provides an operation program setting apparatus for a robot, wherein the robot is configured to move, based on an operation program, a tool attached to a distal end portion of an arm of the robot along a predetermined processing trajectory along a work object, the operation program is for making posture of the tool change at at least a position along the predetermined processing trajectory, the position is a posture changing position, and the operation program setting apparatus includes: a controller configured to add a command to the operation program, the command is for making the tool start to incline when the tool approaches the posture changing position within a range of an acceptable inclination angle, and the range is an angle range within of an angle at which the tool is allowed to be inclined with respect to a surface of the work object.

In the first aspect, time when the tool approaches posture changing position correspond to timing at which the tool reaches the posture changing position. In other words, in the first aspect, a command for making the tool start to incline before the tool reaches the posture changing position is added to the operation program. For example, even when the tool is required to be inclined largely at the posture changing position according to a shape of the surface of the work object, the tool starts incline preliminary before the tool reaches the posture changing position. Therefore, it is possible to reduce the amount of the change of the posture of the tool at the posture changing position, and this is advantageous for improving operation speed of the robot while ensuring quality of a portion to be processed.

In this aspect, preferably, the tool is a laser cutting tool, the operation program setting apparatus further includes: a storage unit that stores acceptable angle setting data that provides correspondence between at least a material and a plate thickness of the work object and the range of the acceptable inclination angle, and wherein the controller adds a command to the operation program, the command is to incline the tool when or immediately before the tool reaches the posture changing position within the range of the acceptable inclination angle obtained using the acceptable angle setting data.

According to this configuration, the command is added to the operation program, the command relating to the inclination angle of the tool when or immediately before the tool reaches the posture changing position within the range of the acceptable inclination angle obtained by using the acceptable angle setting data. As described above, the controller sets the inclination angle of the tool automatically when or immediately before the tool reaches the posture changing position, and therefore it is possible to reduce time and effort when the operation program is set.

Here, it is preferable that the acceptable angle setting data correspond to various materials and plate thicknesses and the range of the acceptable inclination angle. Conventionally, in setting of an operation program that does not use such statistical data, an inclination angle of the tool at a processing position is set based on trial and error. Therefore, it requires long time to set the operation program. By contrast, according to this configuration, as setting for improving operation speed of the robot while ensuring quality of the portion to be processed is automatically performed based on parameters such as the material and the plate thickness of the work object, it is possible both to reduce time and effort and to improve processing quality.

In this aspect, preferably, the tool is a laser cutting tool, the operation program setting apparatus further includes: a storage unit that stores an acceptable angle setting formula for deriving the range of the acceptable inclination angle using at least a material and a plate thickness of the work object, and the controller adds a command to the operation program, the command is to incline the tool when or immediately before the tool reaches the posture changing position within the range of the acceptable inclination angle obtained using the acceptable angle setting formula.

According to this configuration, the command is added to the operation program, the command relating to the inclination angle of the tool when or immediately before the tool reaches the posture changing position within the range of the acceptable inclination angle obtained by using the acceptable angle setting formula. As described above, the control unit sets the inclination angle of the tool automatically when or immediately before the tool reaches the posture changing position, and therefore it is possible to reduce time and effort when the operation program is set.

Conventionally, in setting of an operation program that does not use such an acceptable angle setting formula, an inclination angle of the tool at a processing position is set based on trial and error. Therefore, it requires long time to set the operation program. By contrast, according to this configuration, as setting for improving operation speed of the robot while ensuring quality of the portion to be processed is automatically performed based on parameters such as the material and the plate thickness of the work object, it is possible both to reduce time and effort and to improve processing quality.

In this aspect, preferably, the controller adds a command to the operation program, the command is related to one of a position and timing at which the tool starts to be inclined toward the inclination angle.

According to this aspect, the control unit automatically sets the position or the timing at which the tool starts to be inclined toward the inclination angle. Therefore, it is possible to reduce time and effort when the operation program is set.

In this aspect, preferably, the controller adds a start instruction point to the operation program, the start instruction point is a point at which the tool starts to be inclined toward the inclination angle.

According to this aspect the start instruction point at which the tool starts to be inclined toward the inclination angle is automatically added to the operation program. Therefore, it is possible to reduce time and effort when the operation program is set.

Further, setting of the operation program for processing greatly affects the stability of the quality of the portion to be processed. In this aspect, as the start instruction point is clearly set, it is possible to improve stability of the quality of the portion to be processed, as compared to a case in which the start instruction point is set every time by an interpolation program or the like of the robot.

A robot according to second aspect of the present disclosure includes: an arm having a distal end portion to which a tool is attached; and a controller configured to control the arm based on an operation program, and move the tool along a predetermined processing trajectory along a work object, wherein the operation program is for making posture of the tool to be changed at at least a position along the predetermined processing trajectory, the position is a posture changing position, and the controller is configured to make the tool start to be inclined when the tool approaches the posture changing position within a range of an acceptable inclination angle, the range is an angle range within which the tool is allowed to be inclined with respect to a surface of the work object.

In the second aspect, time when the tool approaches posture changing position correspond to timing at which the tool reaches the posture changing position. In other words, in the second aspect, the tool starts to be inclined before the tool reaches the posture changing position. For example, even when the tool is required to be inclined largely at the posture changing position according to a shape of the surface of the work object, the tool starts to be inclined preliminary before the tool reaches the posture changing position. Therefore, it is possible to reduce the amount of the change of the posture of the tool at the posture changing position, and this is advantageous for improving operation speed of the robot while ensuring quality of a portion to be processed.

A third aspect of the present disclosure provides a method of controlling a robot provided with an arm having a distal end portion to which a tool is attached, the method including: a processing which controls the arm of the robot to move the tool along a predetermined processing trajectory along a work object, wherein the processing trajectory includes at least one posture changing position at which posture of the tool is required to be changed, and in the processing, the controller makes the tool start to be inclined when the tool approaches the posture changing position within a range of an acceptable inclination angle, the range is an angle range at which the tool is allowed to be inclined with respect to a surface of the work object.

According to the aforementioned aspects, it is possible to increase operation speed of the robot while ensuring quality of a portion to be processed.

REFERENCE SIGNS LIST

10 Robot
20 Arm
21 Servo motor
30 Controller
31 Control unit
32 Display unit
33 Storage unit
33a System program
33b Operation program
33c Setting program
33d Acceptable angle setting data
34 Input device
35 Transceiving unit
36 Servo controller
40 Tool
41 Nozzle
41a Through hole
41b Central axis line
42 Laser oscillator
43 Assist gas feeding device
W Work object
α Inclination angle

The invention claimed is:

1. An operation program setting apparatus for a robot, wherein
the robot is configured to move, based on an operation program, a tool attached to a distal end portion of an arm of the robot along a predetermined processing trajectory along a work object,
the operation program is for making posture of the tool change at at least a position along the predetermined processing trajectory, the position is a posture changing position, and
the operation program setting apparatus comprises:
a controller configured to add a command to the operation program, the command makes the tool start to incline when the tool approaches the posture changing position within a range of an acceptable inclination angle, and the range is an angle range within which the tool is allowed to be inclined with respect to a surface of the work object and a storage unit that stores acceptable angle setting data that provides correspondence between at least a material and a plate thickness of the work object and the range of the acceptable inclination angle, wherein the tool is a laser cutting tool, and the controller adds a command to the operation program, the command is to incline the tool when or immediately before the tool reaches the posture changing position within the range of the acceptable inclination angle obtained using the acceptable angle setting data.

2. An operation program setting apparatus for a robot, wherein the robot is configured to move, based on an operation program, a tool attached to a distal end portion of an arm of the robot along a predetermined processing trajectory along a work object, the operation program is for making posture of the tool change at at least a position along the predetermined processing trajectory, the position is a posture changing position, the operation program setting apparatus comprises:

a controller configured to add a command to the operation program, the command makes the tool start to incline when the tool approaches the posture changing position within a range of an acceptable inclination angle, and the range is an angle range within which the tool is allowed to be inclined with respect to a surface of the work object; and a storage unit that stores an acceptable angle setting formula for deriving the range of the acceptable inclination angle using at least a material and a plate thickness of the work object, wherein the tool is a laser cutting tool, and the controller adds a command to the operation program, the command is to incline the tool when or immediately before the tool reaches the posture changing position within the range of the acceptable inclination angle obtained using the acceptable angle setting formula.

3. The operation program setting apparatus for a robot according to claim 1, wherein the controller adds a command to the operation program, the command is related to one of a position and timing at which the tool starts to be inclined toward the inclination angle.

4. The operation program setting apparatus for a robot according to claim 1, wherein the controller adds a start instruction point to the operation program, and the start instruction point is a point at which the tool starts to be inclined toward the inclination angle.

5. A robot comprising:

an arm having a distal end portion to which a tool is attached; and a controller configured to control the arm based on an operation program, and move the tool along a predetermined processing trajectory along a work object, wherein the operation program is for making posture of the tool change at at least a position along the predetermined processing trajectory, the position is a posture changing position, and the controller is configured to make the tool start to be inclined when the tool approaches the posture changing position within a range of an acceptable inclination angle, the range is an angle range within which the tool is allowed to be inclined with respect to a surface of the work object, the robot further comprises:

a storage unit that stores acceptable angle setting data that provides correspondence between at least a material and a plate thickness of the work object and the range of the acceptable inclination angle, or, an acceptable angle setting formula for deriving the range of the acceptable inclination angle using the material and the plate thickness, and the controller adds a command to the operation program, the command is to incline the tool when or immediately before the tool reaches the posture changing position within the range of the acceptable inclination angle obtained using the acceptable angle setting data or the acceptable angle setting formula.

6. A method of controlling a robot provided with an arm having a distal end portion to which a tool is attached, comprising:

processing which controls the arm of the robot to move the tool along a predetermined processing trajectory along a work object based on an operation program, wherein the robot comprises a storage unit that stores acceptable angle setting data that provides correspondence between at least a material and a plate thickness of the work object and a range of an acceptable inclination angle, the range is an angle range within which the tool is allowed to be inclined with respect to a surface of the work object, or, an acceptable angle setting formula for deriving the range of the acceptable inclination angle using the material and the plate thickness of the work object, the processing trajectory includes at least one posture changing position at which posture of the tool is required to be changed, a controller configured to add a command to the operation program, the command is to incline the tool when or immediately before the tool reaches the posture changing position within the range of the acceptable inclination angle obtained using the acceptable angle setting data or the acceptable angle setting formula, and the controller further configured to make the tool start to be inclined when the tool approaches the posture changing position based on a processing program.

* * * * *